(12) United States Patent
Scotto Di Carlo et al.

(10) Patent No.: US 9,288,241 B2
(45) Date of Patent: Mar. 15, 2016

(54) WEB-TELCO CONVERGENCE COMPRISING DOWNLOADING SCRIPT COMMANDS TO USER TERMINALS

(75) Inventors: Vincenzo Scotto Di Carlo, München (DE); Gerhard Kuhn, München (DE); Hans-Heinrich Grusdt, Holzkirchen (DE); Matthias Lott, Planegg (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 394 days.

(21) Appl. No.: 13/816,397

(22) PCT Filed: Aug. 13, 2010

(86) PCT No.: PCT/EP2010/061855
§ 371 (c)(1),
(2), (4) Date: Apr. 26, 2013

(87) PCT Pub. No.: WO2012/019653
PCT Pub. Date: Feb. 16, 2012

(65) Prior Publication Data
US 2013/0212179 A1    Aug. 15, 2013

(51) Int. Cl.
*G06F 15/16* (2006.01)
*H04L 29/06* (2006.01)
(Continued)

(52) U.S. Cl.
CPC .............. *H04L 65/403* (2013.01); *H04L 67/02* (2013.01); *H04L 67/2823* (2013.01); *H04L 67/303* (2013.01); *H04M 1/72525* (2013.01);
(Continued)

(58) Field of Classification Search
USPC ......... 709/203–204, 229, 217, 225, 228, 231, 709/210, 245, 232, 246
See application file for complete search history.

(56) References Cited

U.S. PATENT DOCUMENTS 7,467,211 B1 * 12/2008 Herman et al. ............... 709/229
7,496,627 B2 *  2/2009 Moorer ............... G06F 11/0709
                                                        345/2.2

(Continued)

FOREIGN PATENT DOCUMENTS

EP    1244261 A2    9/2002
EP    1 519 537 A2  3/2005

(Continued)

OTHER PUBLICATIONS

International Search Report and Written Opinion dated Nov. 11, 2010 corresponding to International Patent Application No. PCT/EP2010/061855.

*Primary Examiner* — Jude Jean Gilles
(74) *Attorney, Agent, or Firm* — Squire Patton Boggs (US) LLP (57) ABSTRACT

The present invention relates to methods, apparatus and systems for enabling an improved Web-Telco Convergence, in particular for telecommunication session oriented service. A Web-Telco Convergence Function may identify user interface relevant information in telecommunication protocol messages relating to a telecommunication session oriented service for a user and transmits the identified user interface relevant information to a Virtual Terminal Function. The Virtual Terminal Function may obtain web assets based on the user interface relevant information and generate a user interface description. An address of the location of the user interface description may be transmitted to the Web-Telco Convergence Function which may transmit the address to a user device.

21 Claims, 6 Drawing Sheets

(51) Int. Cl.
*H04M 1/725* (2006.01)
*H04M 3/42* (2006.01)
*H04M 7/00* (2006.01)
*H04L 29/08* (2006.01)
*H04M 1/253* (2006.01)

(52) U.S. Cl.
CPC ...... *H04M1/72561* (2013.01); *H04M 3/42076* (2013.01); *H04M 3/42178* (2013.01); *H04M 7/0027* (2013.01); *H04M 1/2535* (2013.01)

(56) References Cited

U.S. PATENT DOCUMENTS

| | | | |
|---|---|---|---|
| 2003/0074445 A1* | 4/2003 | Roach et al. | 709/224 |
| 2006/0168275 A1* | 7/2006 | Lin et al. | 709/230 |
| 2007/0050477 A1* | 3/2007 | Isaacs | 709/219 |
| 2008/0002726 A1* | 1/2008 | Haung | H04W 8/12 370/401 |
| 2009/0201917 A1* | 8/2009 | Maes | H04L 12/66 370/352 |
| 2010/0198772 A1* | 8/2010 | Silverman | G06Q 30/02 706/52 |
| 2011/0138080 A1* | 6/2011 | Steiner | H04J 3/0664 709/248 |

FOREIGN PATENT DOCUMENTS

| EP | 1819125 A1 | 8/2007 |
|---|---|---|
| WO | WO 03/056732 A1 | 7/2003 |

* cited by examiner

WEB-TELCO CONVERGENCE COMPRISING DOWNLOADING SCRIPT COMMANDS TO USER TERMINALS

The present invention relates to web-telco convergence and, in particular, to web-telco convergence in mobile networks.

In the telecommunication (telco) domain the telco operators provide a series of traditional session oriented communication services and applications such as telephony, chat, messaging and so on. As the ability and technology improves in the telco domain, in particular in the mobile communication domain, additional supplementary services can enhance the basic session oriented communication services such as telephony. Furthermore, the technology in the telco domain is now enabling better and easier Internet access especially in terms of increased available bandwidth along with lower data and connection charges.

In the web domain there is a substantial and varied amount of content, data, information and capabilities, e.g. web assets, which web based service providers can utilise to provide various services to users. Moreover, the web based service providers are utilising the web assets and are moving into offering web based services that were traditionally in the telco domain, for example, Skype™, GoogleTalk™, and so on. By having the ability to utilise the web assets the web based services can offer users enhanced functionality and experience.

Thus, there is need to improve and enhance the session oriented services and applications provided by telco operators in the telco domain in order to compete with the new web based services offered by web based service providers.

As mentioned hereinabove, a telco operator provides various session oriented communication services and applications. Currently, these session oriented communication services and applications are controlled on existing user devices, for example, a mobile device, by a control application. The control application is typically a single piece of software that performs on the device the functions of controlling local communication resources, connectivity, termination of the telco protocol used, application and service logic and user interface control.

However, by combining these functions under the control of a single control application on the device means that there is no flexibility in providing new or updated services or functionality as it would require a new version of the control application.

Presently, there are three approaches that telco operators are using to try and incorporate web assets into their telco services and applications. However, as will be discussed below, each of the present approaches have one or more disadvantages.

Figure 1:
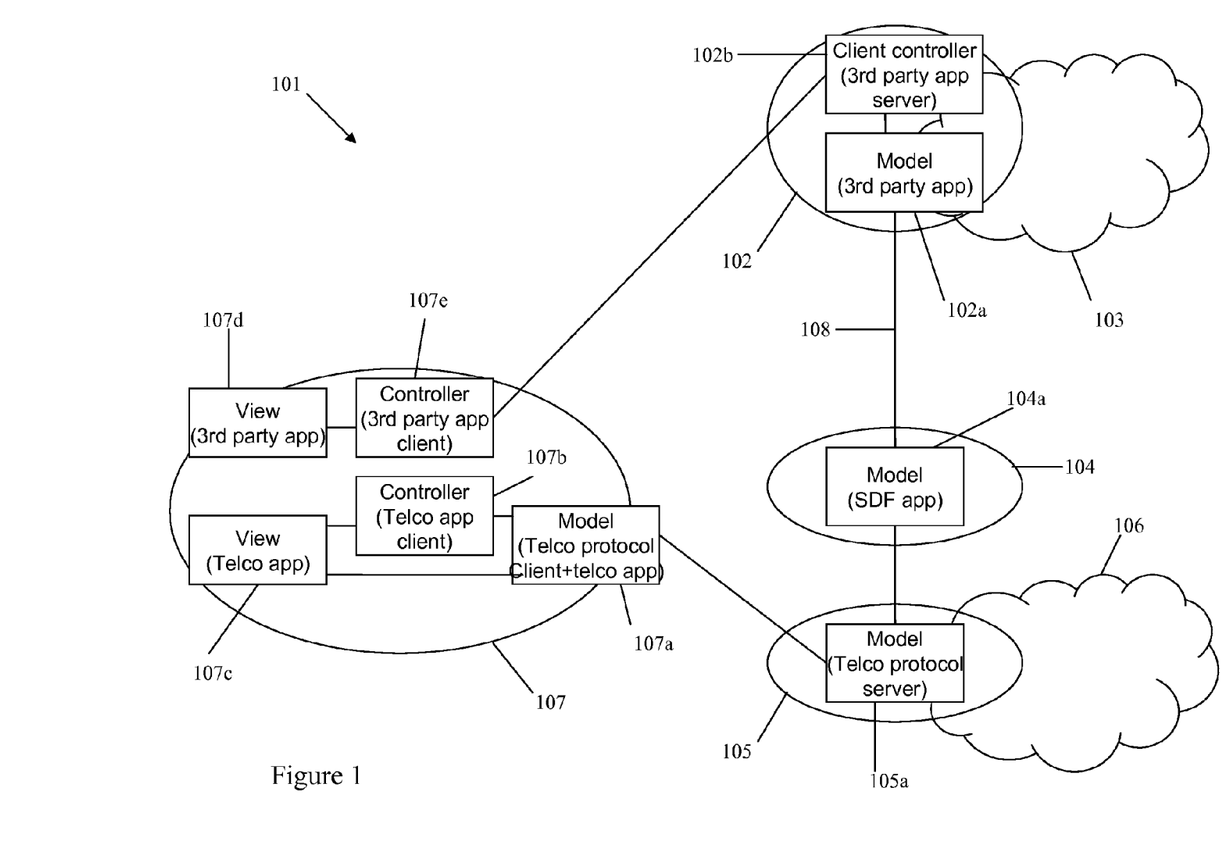
FIG. 1 shows a Model View Controller Pattern diagram of a third party call control system according to the prior art.

The first approach is to execute telco services according to a so-called third party call control model. FIG. 1 shows a simplified Model-View-Controller (MVC) pattern diagram of the third party call control system 101 according to the prior art.

MVC pattern diagrams are known in the art as one method for representing diagrammatically various applications and/or entities in a system. The MVC pattern utilises one or more of three domains in order to represent the functionality of the applications and/or entities in the system. The three domains are a Model representation, a View representation and a Controller representation.

The Model typically represents the behaviour and data relevant to the application and/or entity as well as responding to instructions or requests and managing the information.

The View typically manages the display of information relevant to the application and/or entity. Typically, the View represents a Graphical User Interface on a device and a given application and/or entity may have one or more views.

The Controller typically interprets inputs, informs and/or instructs the View and/or the Model to change and/or respond as appropriate depending on the functionality of the application and/or entity.

The above is a simplified description of the MVC pattern diagrams as this method of representing a system or architecture by one or more of the functional parts is well known in the art.

Referring back to FIG. 1, which shows an MVC pattern diagram for the third party call control system 101, the system 101 includes a web based session control application 102 in a web domain 103, a Telco Protocol Server 105 and a Service Delivery Platform 104 in a telco domain 106, and user device 107.

The user device 107, e.g. a mobile device, personal computer, laptop, tablet device, etc., may interact with the web based session control application 102 and the Telco Protocol Server 105. The web based session control application 102 has an interface, via an openAPI (open Application Program Interface) 108, to the Service Delivery Platform 104 and/or to the Telco Protocol Server 105 to request telco services required by the web based session control application 102.

In the MVC pattern of the system architecture, web based session control application 102 includes a Model 102a and a Controller 102b. The Service Delivery Platform 104 includes an Application Model 104a and the Telco Protocol Server 105 includes a Telco Protocol Model 105a.

The user device 107 in the MVC pattern includes the representations of two distinct functionalities relating to the Telco Protocol and application and the Third Party Application. The Telco Protocol and application on the user device 107 is represented by a Model 107a, a Controller 107b and a View 107c. The Third Party Application is represented by a Controller 107e and a View 107d.

In the third party call control method the user device 104 requires a connection to the web domain 103, e.g. the Internet, in order to access the web based session control application 102. Therefore, web connectivity with an acceptable Quality of Service (QoS) is required in order to enable the user device 104 to instruct the web based session control application 102 to start the service and, consequently, to enable the telco network to establish the telco sessions between the initiating user device 104 and the terminating third party device 107. Thus, if web connectivity is not available or is of poor QoS then the third party call control model approach will not work as the web based session control application 102 cannot be reached and therefore the required telco service cannot be initiated by the web based session control application 102.

Furthermore, the user interface will be split between the one offered by the web based session control application 10d and the one offered by the telco operator 107c where the two different user interfaces 107c, 107d are uncoordinated which causes significant usability issues, especially in race and error/conflict contions, degrading the user experience.

The second approach will be described with reference to FIG. 2 which shows a MVC pattern representation of a system 201 for performing mash up on the user device 202. The term "mash up" is often used to refer to the process of combining the web assets and the telco services and this second approach performs the mash up on the user device 202.

Figure 2:
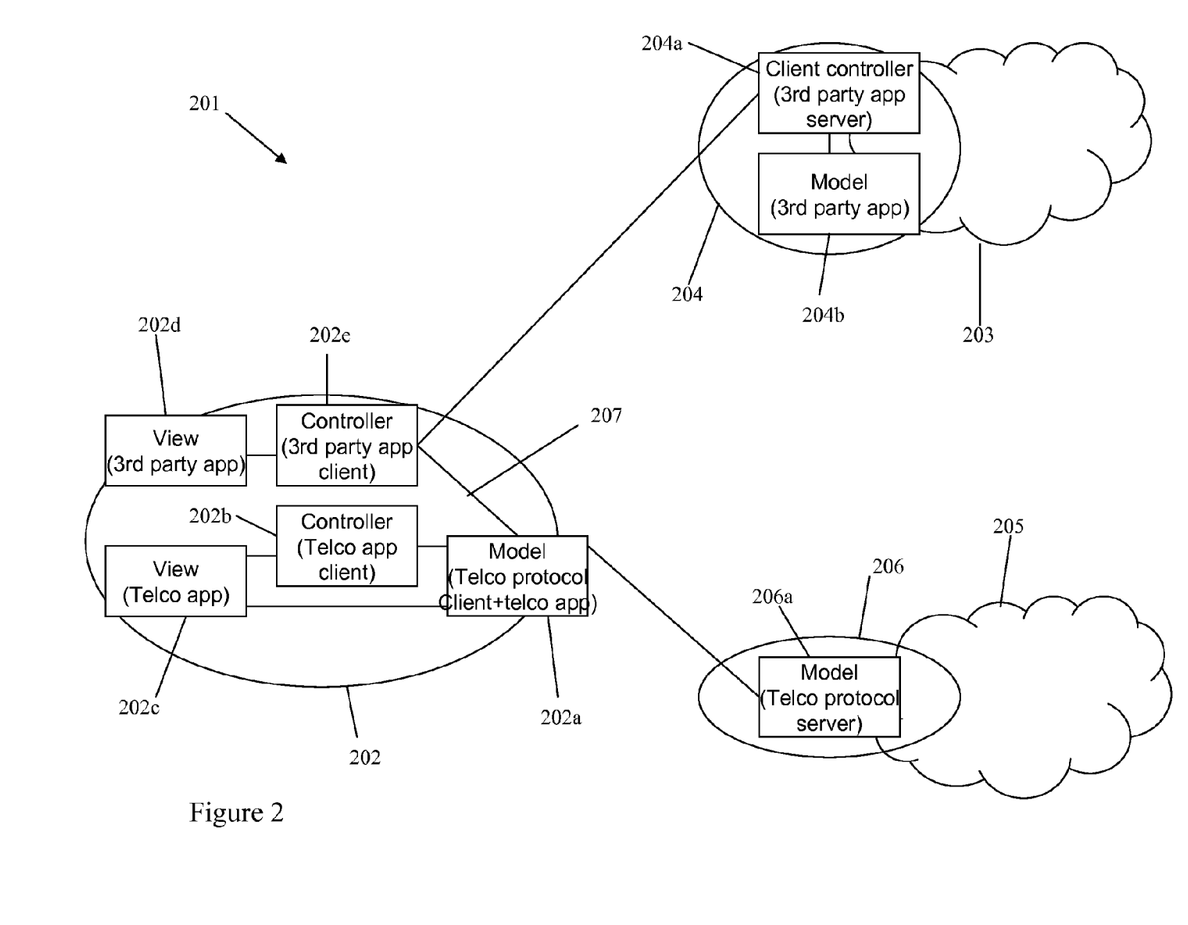
FIG. 2 shows a Model View Controller Pattern diagram of a system for performing mash up on the user device.

The MVC pattern shown in FIG. 2 is very similar to the MVC pattern shown in FIG. 1 and therefore the description of the same aspects will not be repeated here. The main difference between the second approach (shown in FIG. 2) and the first approach (shown in FIG. 1) is that in the second approach there is a user device Application Program Interface (API) 207 between the Controller of the third party application 202e and the Model of the Telco Protocol Client 202a to enable the mash up of web assets and telco services on the user device 207. In contrast to the first approach shown in FIG. 1 where an Open Network API 108 was between the third party web based session control application 102 and the telco protocol server 105 (via the service delivery platform 104).

In the second approach the user device 202 requires an application which can implement the mash up logic where the logic defines, for example, how and/or when web assets are obtained from the web domain 203 which may further be dependent on events or protocol state transitions occurring in or notified by the telco services in the telco domain 204.

Therefore, any change in the mash up logic on the user device 202 requires the development of a new application where the new application has to be deployed to and installed on all of the user devices. This process of developing and deploying new mash up logic applications is both expensive, time consuming and restrictive to developing new or updated applications. Furthermore, in order to develop a mash up logic application the developer requires extensive knowledge of both the web domain 203 and the telco domain 204 which increases the complexity of the process.

Figure 3:
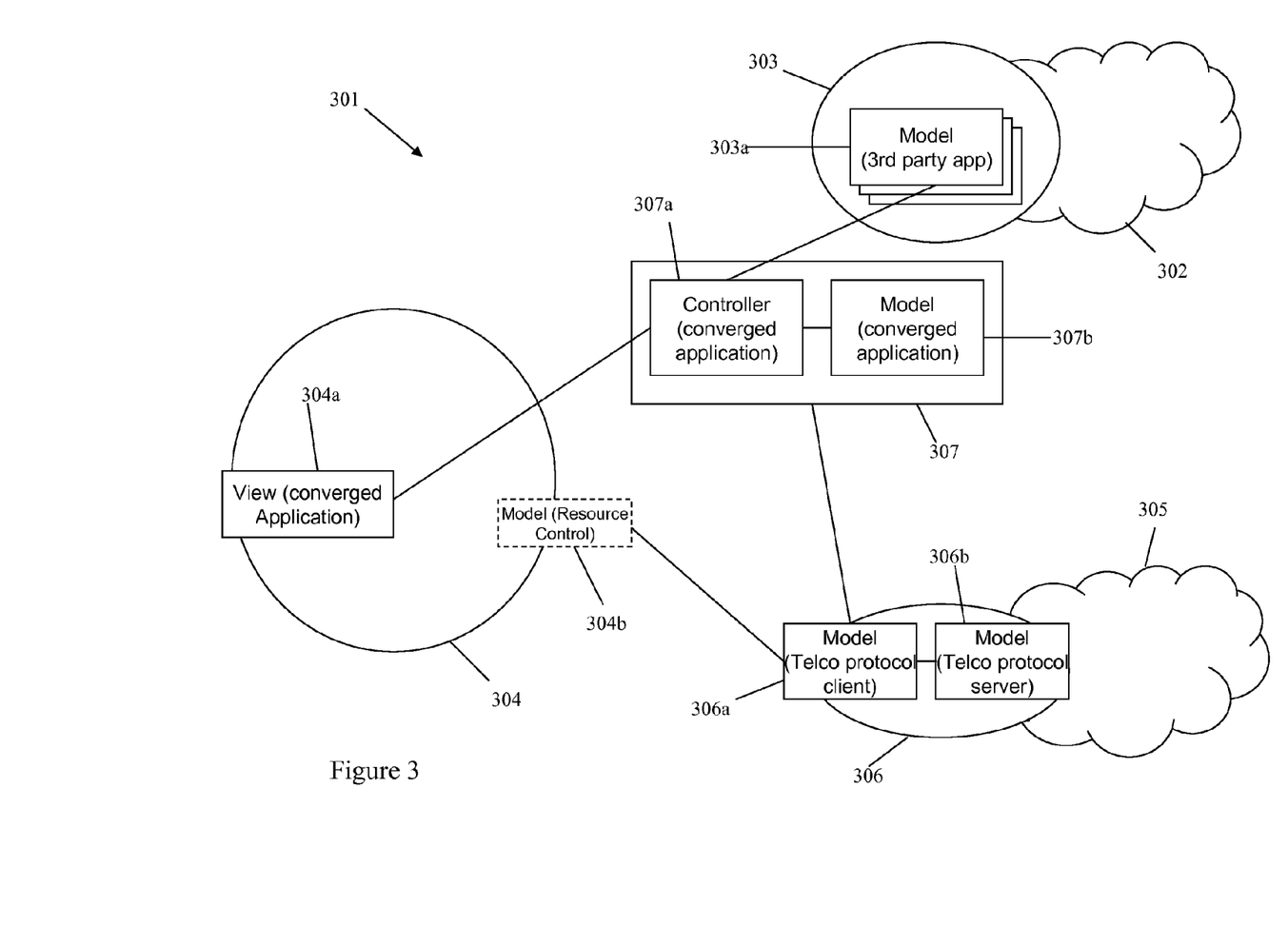
FIG. 3 Model View Controller Pattern diagram of a system for performing the mash up in the web domain.

The third approach, which will be described with reference to the MVC pattern shown in FIG. 3, includes a system 301 for performing the mash up in the web domain 302. In this approach the session control is implemented as a web based application 303 which is represented by the Model 302a. In the web domain 302 there is a converged application 307 that interacts with the third party application 303. The converged application 307 is represented by a Model 307b and a Controller 307a.

User Device 304 includes a View 304a for a converged application and Model 304b for resource control. The user device 304 interacts with the converged application 307 in the web domain 302 via, for example, a web browser on the user device 304 and the converged application 307 performs the mash up of the telco service and the web assets.

The telco protocol used for the telco service is terminated in the telco domain 305 rather than at the user device 304 in this approach. Thus, the telco server 306 includes a Model 306a for the telco protocol client (for terminating the telco service) and a Model 306b of the telco protocol server 306. The telco protocol server 306 interacts with a Model 304b for resource control on the user device 304. Therefore, the resources on the user device 304 and the connectivity means of the user device 304 are controlled by the telco protocol server in the telco domain 305.

The telco protocol server 306 also interacts with the converged application 307 in the web domain 302 so that the converged application 307 can perform the mash up of the web assets and telco services.

However, as the converged application 307 is in the web domain 302 then web connectivity is permanently required in this approach. Accordingly, if there is no web connectivity or low web connectivity QoS then this approach simply does not work. Another disadvantage is that the user device 304 has to allow access from the telco server 306 in the telco domain 305 to local resources on the user device 304. However, this would require the user device 304 allow an external source to control the resources on the user device 304 which would typically be prevented for various reasons, for example, security, privacy, protect Intellectual Property Rights relating to various resources in the user device 304 (e.g. audio and video codecs, etc.).

Thus, there is clearly a need for an improved approach to web-telco convergence.

According to a first aspect of the present invention there is provided a method comprising: receiving user interface relevant information from a web-telco convergence function in a telecommunication domain wherein the user interface relevant information relates to a session oriented service for a user; obtaining web assets from a web domain relating to the session oriented service based on the received user interface relevant information; generating a user interface description based on one or both of the received user interface relevant information and the obtained web assets; determining an address of a location of the generated user interface description; and transmitting a request message to the web-telco convergence function wherein the request message includes the address and requests that the address is transmitted to a user device of the user via the telecommunication domain so as to enable the user device to obtain the user interface description from the location identified by the address.

Thus, in many of the embodiments there is provided methods, apparatus and systems for mashing up telecommunication domain information, with web assets retrieved or obtained from the web domain.

In this respect, the web domain refers to the large collection of interconnected documents, websites, content, logic, applications and other resources that are typically running on the Internet. The term web assets are used to collectively refer to the documents, websites, content, logic, applications and other resources in the web domain.

The telecommunication domain is used to refer collectively to telecommunication networks, including access networks and transport networks, management systems and the telecommunication protocols implemented in the telecommunication networks. Telecommunication session oriented services and applications may include, for example, interactive voice, video, messaging and multimedia between one or more parties.

User interface relevant information may relate to any information that may be relevant to a user interface display, for example, an initiating party identification, a terminating party identification, and so on.

Therefore, in many of the embodiments, user interface relevant information may be received from the telecommunication domain from a web-telco convergence function. Web assets may be obtained (either at the time of receiving the user interface relevant information or at an earlier time and previously cached) that relate to the telecommunication session oriented service based on the user interface relevant information. The mash up of web assets and the information handled/included in telecommunication session oriented services may then be embedded in the user interface description. An address of the location of the user interface description may then be determined and transmitted to the web-telco convergence function as part of a request message. This request message enables the address to be transmitted to a user device via the telecommunication domain so as to enable the user device to obtain the user interface description.

The address may be a Uniform Resource Locator (URL), or any other address at which the interface description may be located:

Therefore, many of the embodiments advantageously provide improved and flexible web-telco convergence enabling telecommunication session oriented services to be enriched or enhanced with web assets.

The method may be for operating a converged application. The method may be for operating a Virtual Terminal Function. The Virtual Terminal Function may be the converged application. The generated interface description may be the view of the converged application in terms of the mashed up web assets and telco services. The web assets may be obtained from one or more third party applications in the web domain. The Web-Telco Convergence Function may be on a telco server in a telco domain.

The method may further comprise the steps of generating script commands wherein the script commands control at least part of the telecommunication session oriented service for the user; and embedding the script commands in the user interface description.

Accordingly, the method may also enable the telecommunication session oriented service to be controlled by embedding script commands (e.g. JavaScript) into the user interface description which may be obtained or downloaded by the user device. Therefore, a controller of the converged application on the user device may execute the commands, for example within a browser supporting such scripting (e.g. JavaScript), or may be based on Java Applets, and so on.

The method may further comprise the step of storing the user interface description at a location in the web domain wherein the address relates to the location of the stored user interface description.

The method may further comprise generating commands for the telecommunication session oriented service for the user and transmitting the commands to the web-telco convergence function. Therefore, the method may control the telecommunication session oriented service and/or the operation of the web-telco convergence function.

According to a second aspect of the present invention there is provided an apparatus comprising: a first input adapted to receive user interface relevant information from a web-telco convergence function in a telecommunication domain wherein the user interface relevant information relates to a session oriented service for a user; a first processor adapted to obtain web assets from a web domain relating to the session oriented service based on the received user interface relevant information; a second processor adapted to generate a user interface description based on one or both of the received user interface relevant information and the obtained web assets; a third processor adapted to determine an address of a location of the generated user interface description; and a first output adapted to transmit a request message to the web-telco convergence function wherein the request message includes the address and requests that the address is transmitted to a user device of the user via the telecommunication domain so as to enable the user device to obtain the user interface description from the location identified by the address.

According to a third aspect of the present invention there is provided an apparatus adapted to receive user interface relevant information from a web-telco convergence function in a telecommunication domain wherein the user interface relevant information relates to a session oriented service for a user; obtain web assets from a web domain relating to the session oriented service based on the received user interface relevant information; generate a user interface description based on one or both of the received user interface relevant information and the obtained web assets; determine an address of a location of the generated user interface description; and transmit a request message to the web-telco convergence function wherein the request message includes the address and requests that the address is transmitted to a user device of the user via the telecommunication domain so as to enable the user device to obtain the user interface description from the location identified by the address.

The second processor may be further adapted to generate script commands wherein the script commands control at least part of the telecommunication session oriented service for the user; and the second processor may be further adapted to embed the script commands in the user interface description.

The apparatus may further comprise a fourth processor adapted to store the user interface description at a location in the web domain wherein the address relates to the location of the stored user interface description.

The apparatus may further comprise a fifth processor adapted to generate commands for the web-telco convergence function; and a second output adapted to transmit the commands to the web-telco convergence function.

The apparatus may be a computing device or a server. The apparatus may be for a virtual terminal function. The apparatus may be in a web domain or in a telco domain.

The first output and second output may be the same output or different outputs. The first processor, second processor, third processor, fourth processor and fifth processor may be the same processor, different processors or any combination thereof.

The apparatus may be adapted by hardware, software or any combination thereof.

According to a fourth aspect of the present invention there is provided a computer program product comprising computer readable executable code for: receiving user interface relevant information from a web-telco convergence function in a telecommunication domain wherein the user interface relevant information relates to a session oriented service for a user; obtaining web assets from a web domain relating to the session oriented service based on the received user interface relevant information; generating a user interface description based on one or both of the received user interface relevant information and the obtained web assets; determining an address of a location of the generated user interface description; and transmitting a request message to the web-telco convergence function wherein the request message includes the address and requests that the address is transmitted to a user device of the user via the telecommunication domain so as to enable the user device to obtain the user interface description from the location identified by the address.

The computer program product may further comprise computer readable executable code for performing any or all of the functions in accordance with the aspects of the invention.

According to a fifth aspect of the present invention there is provided a method comprising: receiving telecommunication protocol messages relating to a telecommunication session oriented service for a user; identifying user interface relevant information in the received telecommunication protocol messages; transmitting the identified user interface relevant information to a virtual terminal function; receiving a request message from the virtual terminal function wherein the request message includes an address of a location of a user interface description and wherein the user interface description is based on web assets obtained from a web domain by the virtual terminal function; and transmitting the address to a user device of the user via a telecommunication domain so as to enable the user device to obtain the user interface description from the location identified by the address.

Thus, in many of the embodiments, information relevant to a user interface that is present in telecommunication protocol messages may be identified and transmitted to a virtual terminal function. A request message may then be received from the virtual terminal function where the request message may include an address. The address defines the location of a user interface description which the virtual terminal function may have generated based on the web assets obtained or retrieved from the web domain. The address may be transmitted to a user device via the telecommunication domain so as to enable the user device to obtain or retrieve the user interface description.

The address may be a Uniform Resource Locator (URL), or any other address of the location of the interface description. The method may be for operating a Web-Telco Convergence Function. The method may be for operating a server, for example, a telco protocol server in the telco domain. The address may be transmitted to the user device via a telco protocol such as Session Initiation Protocol (SIP) or any other telco protocol.

Accordingly, many of the embodiments of the present invention advantageously provide an improved and flexible web-telco convergence enabling telecommunication session oriented services to be enriched or enhanced with web assets.

The step of transmitting the address to a user device may comprise the step of inserting the address into a payload of a telecommunication protocol message.

The method may further comprise receiving commands from the virtual terminal function; and executing the commands. The commands may relate to the function of the web-telco convergence function, the control of the telecommunication session oriented service for the user.

According to a sixth aspect of the present invention there is provided an apparatus comprising: a first input adapted to receive telecommunication protocol messages relating to a telecommunication session oriented service for a user; a first processor adapted to identify user interface relevant information in the received telecommunication protocol messages; a first output adapted to transmit the identified user interface relevant information to a virtual terminal function; a second input adapted to receive a request message from the virtual terminal function wherein the request message includes an address of a location of a user interface description and wherein the user interface description is based on web assets obtained from a web domain by the virtual terminal function; and a second output adapted to transmit the address to a user device of the user so as to enable the user device to obtain the user interface description from the location identified by the address.

According to a seventh aspect of the present invention there is provided an apparatus adapted to receive telecommunication protocol messages relating to a telecommunication session oriented service for a user; identifying user interface relevant information in the received telecommunication protocol messages; transmit the identified user interface relevant information to a virtual terminal function; receive a request message from the virtual terminal function wherein the request message includes an address of a location of a user interface description and wherein the user interface description is based on web assets obtained from a web domain by the virtual terminal function; and transmitting the address to a user device of the user via a telecommunication domain so as to enable the user device to obtain the user interface description from the location identified by the address.

The apparatus may further comprise a second processor adapted to the address into a payload of the received telecommunication protocol messages.

The apparatus may further comprise a third input adapted to receive commands from the virtual terminal function; and a second processor adapted to execute the commands.

The apparatus may be a computing device or a server. The apparatus may be for a web-telco convergence function. The apparatus may be in a web domain or in a telco domain.

The first input, second input and third input may be the same inputs, different inputs or any combination thereof. The first output and second output may be the same output or different outputs. The first processor and second processor may be the same processor or different processors.

The apparatus may be adapted by hardware, software or any combination thereof.

According to an eighth aspect of the present invention there is provided a computer program product comprising computer readable executable code for: a first input adapted to receive telecommunication protocol messages relating to a telecommunication session oriented service for a user; a first processor adapted to identify user interface relevant information in the received telecommunication protocol messages; a first output adapted to transmit the identified user interface relevant information to a virtual terminal function; a second input adapted to receive a request message from the virtual terminal function wherein the request message includes an address of a location of a user interface description and wherein the user interface description is based on web assets obtained from a web domain by the virtual terminal function; and a second output adapted to transmit the address to a user device of the user so as to enable the user device to obtain the user interface description from the location identified by the address.

The computer program product may further comprise computer readable executable code for performing any or all of the functions in accordance with the aspects of the invention.

According to a ninth aspect of the present invention there is provided a method comprising: receiving a message from a web-telco convergence function wherein the message relates to a telecommunication session oriented service for a user and the message includes an address of a location of a user interface description; obtaining the user interface description from the location based on the address; and displaying the user interface description wherein the user interface description relates to a web-telco converged display for the telecommunication session oriented service.

Therefore, a user interface description relating to a web-telco converged view for a telecommunication session oriented service for a user can be obtained from an address received in a message. The message may be a telecommunication protocol message. The address may be a Uniform Resource Locator (URL).

The method may be for operating a user device. The user device may be a mobile device. The mobile device may be a mobile telephone.

The method may further comprise identifying script commands in the user interface description wherein the script commands control at least part of the telecommunication session oriented service; and executing the identified script commands. Therefore, the user interface description may include commands for controlling the telecommunication session oriented service which can be executed.

According to a tenth aspect of the present invention there is provided an apparatus comprising: an input adapted to receive a message from a web-telco convergence function wherein the message relates to a telecommunication session oriented service for a user and the message includes an address of a location of a user interface description; a first processor adapted to obtain the user interface description from the location based on the address; and a second processor adapted to display the user interface description wherein the user interface description relates to a web-telco converged display for the telecommunication session oriented service.

According to an eleventh aspect of the present invention there is provided an apparatus adapted to receive a message from a web-telco convergence function wherein the message relates to a telecommunication session oriented service for a user and the message includes an address of a location of a user interface description; obtain the user interface description from the location based on the address; and display the user interface description wherein the user interface description relates to a web-telco converged display for the telecommunication session oriented service.

The apparatus may further comprise a third processor adapted to identify script commands in the user interface description wherein the script commands control at least part of the telecommunication session oriented service; and a fourth processor adapted to execute the identified script commands. According to a twelfth aspect of the present invention there is provided a computer program product comprising computer readable executable code for: receiving a message from a web-telco convergence function wherein the message relates to a telecommunication session oriented service for a user and the message includes an address of a location of a user interface description; obtaining the user interface description from the location based on the address; and displaying the user interface description wherein the user interface description relates to a web-telco converged display for the telecommunication session oriented service.

The computer program product may further comprise computer readable executable code for performing any or all of the functions in accordance with the aspects of the invention.

In any of the above computer program product aspects the product may be any storage medium, e.g. disc, hard-drive, memory stick, and so on.

According to a thirteenth aspect of the present invention there is provided a system comprising a virtual terminal function and a web-telco convergence function in which: the web-telco convergence function receives telecommunication protocol messages relating to a telecommunication session oriented service for a user; the web-telco convergence function identifies user interface relevant information in the received telecommunication protocol messages; the web-telco convergence function transmits the identified user interface relevant information to the virtual terminal function; the virtual terminal function receives the user interface relevant information from the web-telco convergence function in a telecommunication domain wherein the user interface relevant information relates to the telecommunication session oriented service for a user; the virtual terminal function obtains web assets from a web domain relating to the session oriented service based on the received user interface relevant information; the virtual terminal function generates a user interface description based on one or both of the received user interface relevant information and the obtained web assets; the virtual terminal function determines an address of a location of the generated user interface description; the virtual terminal function transmits a request message to the web-telco convergence function wherein the request message includes the address and requests that the address is transmitted to a user device of the user via the telecommunication domain so as to enable the user device to obtain the user interface description from the location identified by the address; the web-telco convergence function receives the request message from the virtual terminal function wherein the request message includes the address of the location of the user interface description and wherein the user interface description is based on web assets obtained from a web domain by the virtual terminal function; and the web-telco convergence function transmits the address to a user device of the user so as to enable the user device to obtain the user interface description from the location identified by the address.

The virtual terminal function and the web-telco convergence function may be implemented on the same apparatus, e.g. a computing device, server, and so on, they may be separate, or combined as one functionality. The virtual terminal function and the web-telco convergence function may be located in the web domain, in the telco domain or any combination thereof.

Embodiments of the present invention will now be described, by way of example only, and with reference to the accompanying drawings in which.

Figure 4:
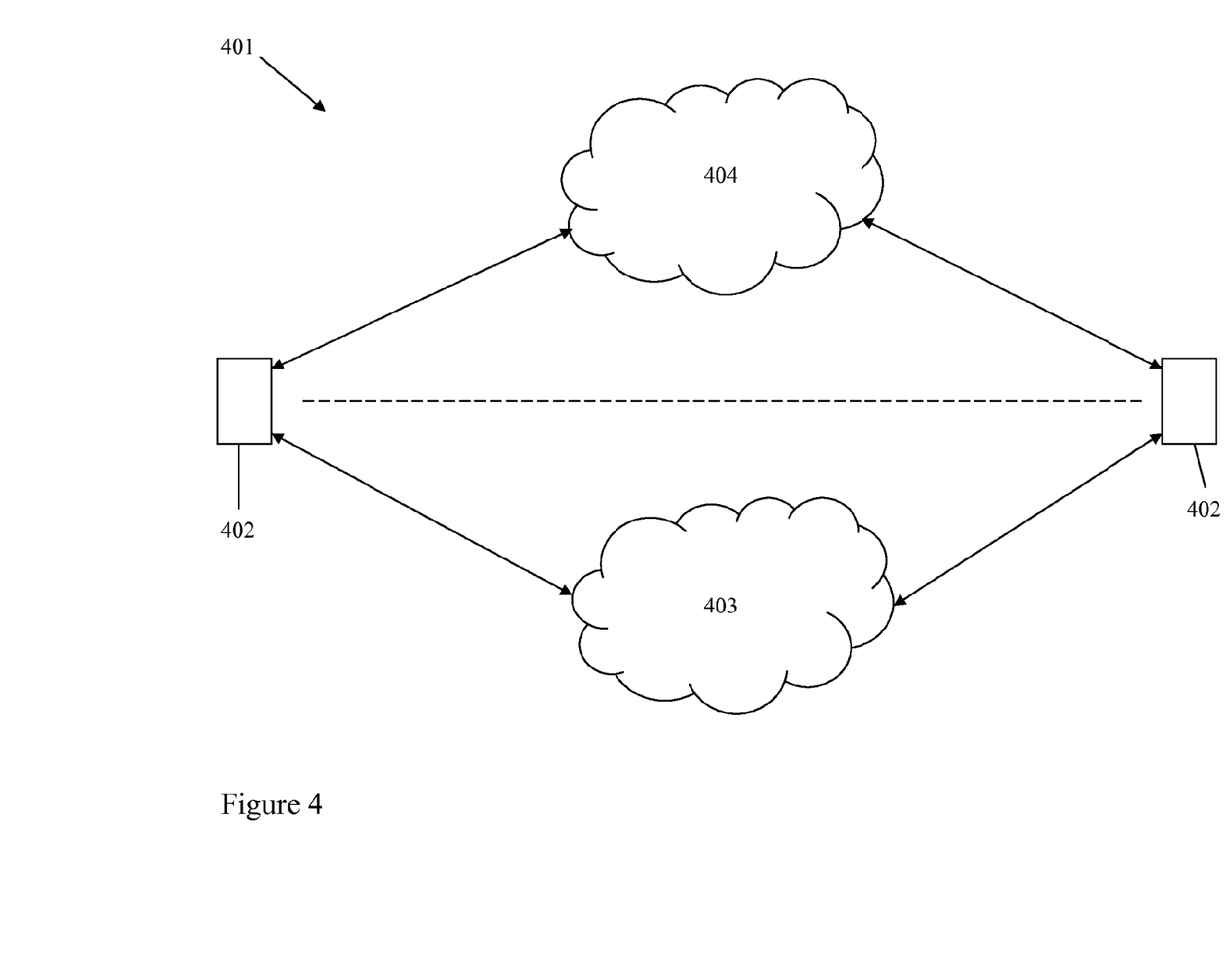
FIG. 4 shows a simplified block diagram of an arrangement of the domains that a user device can access in accordance with many aspects of the present invention.

FIG. 4 shows a simplified block diagram of an arrangement 401 of the domains that a user device 402 can access. The user device 402 may be a mobile device, for example, a mobile telephone, laptop, personal digital assistant, and so on, or another device such as a personal computer.

The user device 402 can access or connect with two domains which presently are effectively distinct and separate.

The first domain is the telco domain 403 which provides the telco services to the user device 402. The telco domain 403 will include a generic mobile or a fixed telecommunication network and thus, the user device 402 will connect with the telco domain 403 via a wireless or wired interface. The telco domain enables the user device 402 to communicate with other user devices 402, for example, by transmitting Short Message Service (SMS) message, transmitting Multimedia Message Service (MMS) messages, initiating voice calls, and so on.

The second domain is the web domain 404 which the user device 402 may interact with, for example, via a web browser or a widget on the user device 402, in order to access web sites, content, user information, web applications, and so on.

Presently, the two domains (the telco domain 403 and the web domain 404) are effectively separate without any interaction therebetween. However, as discussed above, new applications such as Skype™ based on the web domain are challenging the typical telco domain by enabling users to make, for example, voice calls with other users which can be enhanced and enriched by web assets, such as web content and information.

Thus, the telco operators wish to provide telco services and applications which can be enhanced and enriched with web assets in order to compete with the web based services. In other words, there is a clear need for an improved telco-web convergence.

In many of the embodiments, an improved system, method and apparatus will be described that enables telco operators to provide telco services that can be enriched or enhanced by web assets. In the described embodiments the user device is a mobile device. However, as discussed above, the user device may be any device that may communicate via a wireless interface to a mobile network.

Figure 5:
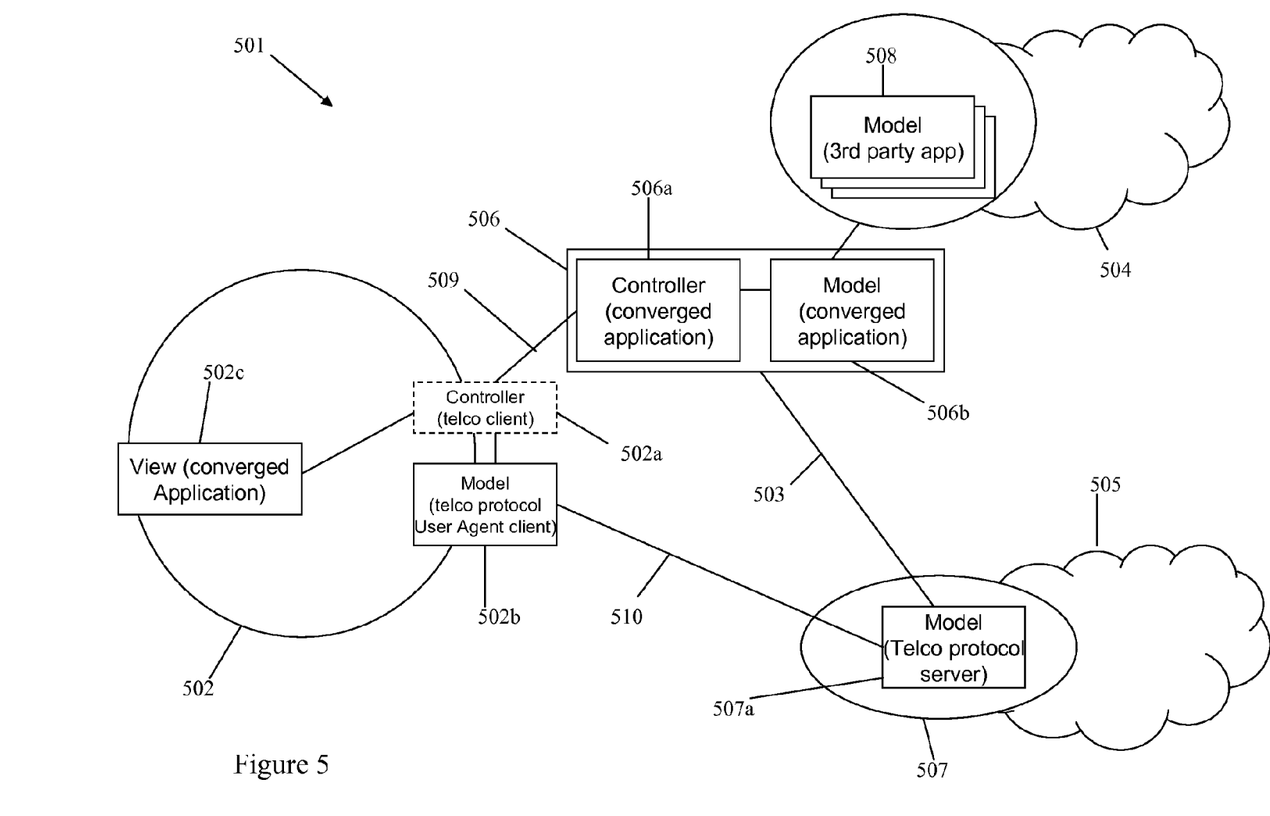
FIG. 5 shows a Model View Controller Pattern diagram of a system in accordance with many of the embodiments of the present invention.

FIG. 5 shows a Model View Controller Pattern diagram of a system 501 in accordance with many of the embodiments of the present invention. The system 501 may include a user device 502 which may interface with the web domain 504 and the telco domain 505, for example, via a mobile network. In this example, a Virtual Terminal Function (VTF) 506 is part of the web domain 504 and a Web Telco Convergence Function (WTCF) 507 in the telco domain 505.

The user device 502 may communicate with the web domain 504 and the VTF 506 via a communication channel 509. The user device 502 may communicate with the telco domain 505 and the WTCF 507 via the communication channel 510.

In many of the embodiments, the VTF 506 may communicate with the WTCF 507 via an Application Program Interface (API) 503 in order to transmit and receive data therebetween.

In FIG. 5 the VTF 506 and the WTCF 507 are shown as separate components that interact via the API 503. However, in many of the embodiments the VTF 506 and WTCF 507 may alternatively be integrated together in the telco domain 505. Furthermore, the VTF 506 and WTCF 507 functionalities may be integrated together as two components with the API 503 therebetween, or the VTF 506 and WTCF 507 functionalities may be integrated as one component where a separate API 503 is not required.

The VTF 506 provides various functionalities to improve the web-telco convergence for mobile communications. In the example shown in FIG. 5, the VTF 506 is located in the web domain 504 and may be implemented on a computing device, for example, a server. The VTF 506 functionality enables a converged application which implements the logic for performing the mash up of web assets and telco services. The VTF 506 includes, in terms of the MVC pattern diagram representation, a Model for the converged application 506b and a Controller for the converged application 506a. The VTF 506 may also interact with one or more third party web applications 508 in the web domain.

The VTF 506 includes functionality for collecting and mashing data from the telco and web domain, according to the model of the converged application 506b. It may also include functionality to interpret any user input via the user device 502 in the controller 506a. The VTF 506 may need to transmit commands or request messages (for example, to request the telco protocol server 507 to forward an address of the generated interface description to the user device 502). The commands are interpreted by the telco protocol server 507 (e.g. by the Model 507a in the MVC pattern representation) resulting in the control of the session oriented services. The VTF 506 may also provide commands, for example, in the form of a scripting language embedded in the user interface description, for the user device 502, which enable the controller for the telco client 502b in interaction with the telco user agent model 502a on the user device 502 to control the session on the user device 502.

The logic for controlling the session oriented service can then be executed locally on the user device 502, in response to and depending on the input commands given by the user of the mobile device 502; via the user interface description that has been downloaded and rendered on the user device 502 by the View 502c.

The VTF 506 performs the mashing up of telco information and web assets in order to provide enhanced and enriched mobile communications. The user interface that the VTF 506 defines is built or generated by the converged application controller 506a in the VTF 506 based on several factors including, for example, the session oriented service initiated by the user on the user device 502, on the telco domain 505 information and on the web assets from the web domain 504. Thus, the user interface description and any embedded script to control the session oriented service can be based on the mash up of the telco based information and the web based information.

The VTF 506 obtains or retrieves web assets, such as content and information, from one or more third party web applications 508 in the web domain 504. The VTF 506 may also receive user interface relevant content of telco protocol messages and telco events via the API 503 from the WTCF 507 in the telco domain 505.

Based on the received web assets and/or any content of telco protocol messages and telco events that are relevant to the user interface, the VTF 506 may determine that the user interface requires a new interface, an updated interface and/or an aspect of the session needing to be controlled. The VTF 506 may generate a user interface description and may generate a URL from which the new or updated user interface description may be obtained or retrieved from by the user device 502.

The VTF 506 may define the user interface description in a declarative language that may be implemented by a browser on the user device 502, such as Hyper-Text Markup Language (HTML). The user interface description may include the information to be displayed on the user device 502 to the user as well as the control functions that may trigger actions in a given state. By defining the user interface in a declarative language then the user interface may be defined or designed independently from the capabilities of the platform, e.g. user device 502, on which the user interface is to be rendered which advantageously avoids portability issues between different user devices 502.

The information to be displayed by the user interface is received or obtained (from the web domain 504 and the telco domain 505) and formatted according to the mash up logic and functionality implemented in the VTF 506. Thus, the VTF 506 may obtain or receive any web assets, e.g. content, information, applications, resources, and so on, as the VTF 506 can process and format the obtained or received web assets as required in accordance with the mash up logic.

The user interface description may also comprise scripting language code, for example, Javascript, which can be executed on the user device 502 in order to, for example, trigger the telco User Agent on the user device 502 to perform any necessary actions and functions.

The VTF 506 transmits the address, e.g. a URL, of the new or updated user interface description to the WTCF 507 via the API 503 so that the WTCF 507 may transmit the address to the user device 502 via the implemented telco protocol. The mechanism for the WTCF 507 to transmit the address to the user device 502 will be described further below.

Thus, the VTF 506 may trigger the user device 502, via the telco domain 505, to obtain or retrieve an updated user interface description based on one or more of the web assets, any content of telco protocol messages, telco events or state transitions to the user device 502 during the session oriented service that the user device 502 initiated.

The VTF 506 may also generate an updated user interface description at any time which it may asynchronously inform the WTCF 507 of the respective address, e.g. URL, which in turn will trigger the user device 502 to obtain or retrieve the new or updated user interface. Thus, the new or updated user interface description may be generated either in response to the status of the telco protocol of the telco domain 505 or at any other time that the VTF 506 needs to generate a new or updated user interface, for example, if requested to do so by the user device 502.

The VTF 506 therefore includes an interface towards the telco domain 505, e.g. via the API 503, in order to receive telco related information and to enable the VTF 506 to transmit data to the user device 502 via the telco domain 505. The VTF 506 also includes an interface to the web domain, e.g. via Hyper-Text Transfer Protocol (HTTP) or web service, in order to retrieve, obtain or receive web assets, such as web content and information.

The VTF 506 defines the user interface for the entire session oriented telco service initiated by the user device 502, controls the session oriented telco service and performs the mash up logic so as to enable the web-telco convergence. The control of the session oriented telco service performed by the VTF 506 is also separate to and independent from the protocols used in the telco domain 505.

The controller 506a in the VTF 506 defines the user interface but the user interface is rendered on the user device 502, by for example the View 502c, which provides significant user interface flexibility, optimisation and responsiveness. A further advantage is the deployment of new or modified functionalities is fast and cost effective as only the VTF 506 requires the modified logic or applications and not the user device 502.

Similarly, the interactions with the telco user agent model 502a is also defined on or by the converged application controller 506a in the VTF 506 but is executed on the user device 502 as any necessary commands for the controller 502b on the user device 502 may be transmitted or downloaded to the user device 502 as embedded script in the user interface description. Therefore, again new or modified control logic or applications may be deployed simply and in a cost effective manner as only the VTF 506 requires the modified control logic or applications.

The VTF 506 may obtain the relevant web assets and other information to generate a user interface description when the user device 502 requests an updated user interface and/or once the VTF 506 receives a notification from the WTCF 507 relating to a telco protocol message, a telco event or a state transition.

The VTF 506 may generate a user interface description in response to information or data from any source in the system or network.

The VTF 506 may further perform security checking and validation of the web assets obtained from the web domain 504 in order to prevent any security risks in relation to the telco session oriented service.

The WTCF 507 may be located in the telco domain 505 and may be operated by the telco operator. The WTCF 507 functionality may be implemented on an IP Multimedia System (IMS) Application Server in the case that the telco network is an IMS network. In the case of a non-IMS network the WTCF 507 functionality may be implemented on any other network element, for example, in an eXtensible Messaging and Presence Protocol (XMPP) based network, it could be integrated in an XMPP server.

The WTCF 507 enables the separation of the telco protocol User Agent 502a, 502b implemented on the user device 502 from the user interface description application or controlling logic implemented by the VTF 506. This is because the WTCF 507 identifies information in the telco protocol messages, for example, caller/called party identity, and information relating to any telco events or state transitions that are relevant to the user interface and provides this information to the VTF 506 in the web domain 504. The information identified by the WTCF 507 can be transmitted to the VTF 506 via the API 503.

As described hereinabove, the VTF 506 may generate a new or updated user interface description based on the information it receives from the WTCF 507. The VTF 506 may then, if required, perform a mash up of the obtained web assets and the information received from the WTCF 507 in the telco domain 505.

The VTF 506 may generate the new or updated user interface and transmit a request to the WTCF 507 to trigger the user device 502 to obtain the new or updated user interface description. Thus, the VTF 506 may respond to the information receive from the WTCF 507 with an address, e.g. a Uniform Resource Locator (URL), from which location the user device 502 may retrieve the new or updated user interface description. The URL may be transmitted to the WTCF 507 via the API 503.

As the new or updated user interface description was generated by the VTF 506 in response to information received relating to a telco event (e.g. a telco protocol message) then the WTCF 507 may transmit the URL to the user device 502 in a payload part of or piggy-backed to the telco protocol message. For example, if the telco protocol in use is the Session Initiator Protocol (SIP) then the URL may be added to the payload part of the SIP message to the user device 502. However, as will be appreciated may other transport mechanisms are possible in a telecommunication network to transmit data to a user device 502.

However, as described hereinabove, the VTF 506 may also generate a new or updated user interface description that is not in response to a telco event (e.g. a telco protocol message or a state transition). In this case, the VTF 506 may also asynchronously request the WTCF 507 to transmit the URL of the location of the new or updated user interface description to the user device 502. The WTCF 507 may then generate a message according to the telco protocol being used, include the URL as part of the message and transmit it to the user device 502 thereby triggering the user device 502 to obtain the new or updated user interface description. For example, in the case of the telco protocol used is SIP then the WTCF 507 may generate a SIP INFO message and include the URL in the payload of the INFO message. Alternatively, the WTCF 507 may use or may instruct a network element to send such trigger information to the user device 502 by any means.

Thus, the WTCF 507 hides the complexity of the telco protocol from the VTF 506 as the WTCF 507 identifies or extracts the relevant information from the telco protocol events (e.g. messages and/or state transitions) and transmits only the relevant information to the VTF 506. Therefore, the VTF 506 does not need to know the telco protocol implemented and may work with any telco protocol implemented as it is independent of the telco protocol. This has the advantage that the applications and logic can be developed for the VTF 506 without any need to know or understand the telco protocols that may be used in the telco domain.

The API 503 between the VTF 506 and the WTCF 507 may be based on web technologies and protocols, for example, web services using Simple Object Access Protocol (SOAP).

The user device 502 implements a telco protocol User Agent 502a, 502b for terminating the telco protocol signalling (e.g. SIP signalling) implemented in the telco domain 505. The User Agent 502a, 502b may be interfaced by a framework which is developed and installed on the user device 502 by the device manufacturer. The user device 502 is also able to render web pages which are defined in terms of a declarative language generated by the VTF 506. Therefore, the user device 502 may include a web browser which may also be used for general web surfing.

The framework enables the web browser to interact with and access local resources, applications and gadgets via, for example, JavaScript, and to interface with the User Agent in a secure manner. Therefore, the framework enables the User Agent to interact with the browser, for example, to trigger the browser to update the user interface, to enable the browser to interact with the User Agent, and to request functions involving use of local resources. The framework therefore also enables the VTF 506 to control the telco session oriented service via the Javascript commands embedded in the user interface, for example, requesting start/stop of Real Time Protocol (RTP) streams for bidirectional media exchange.

Figure 6:
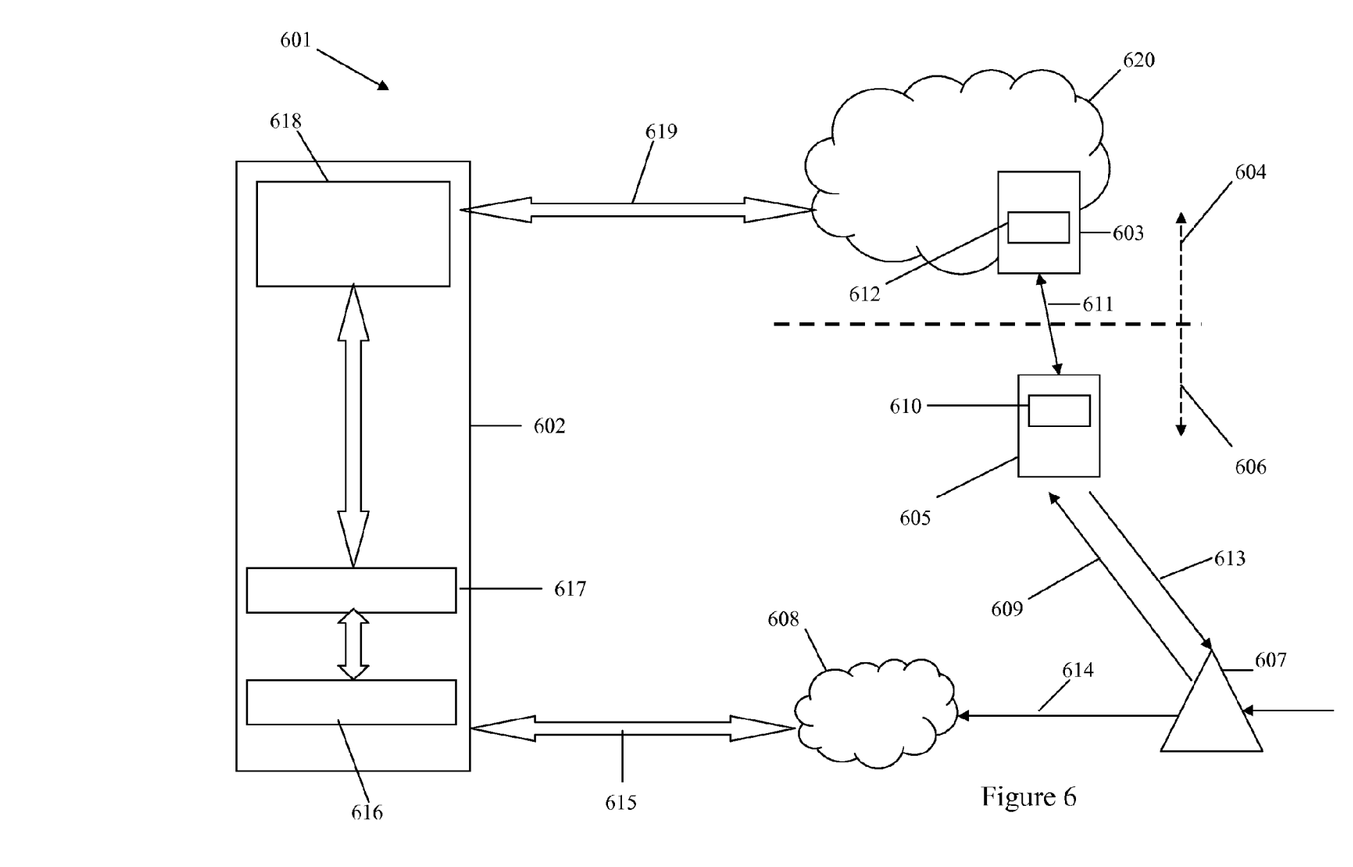
FIG. 6 shows a simplified block diagram of a system in accordance with many of the embodiments of the present invention.

FIG. 6 shows a block diagram of an arrangement of the system 601 in relation to the interaction of one user device 602, a VTF 603 in the web domain 604 and a WTCF 605 in the telco domain 606 in order to enhance the telco information transported to the user device 602 via the telco protocol messages, in accordance with many of the embodiments.

FIG. 6 shows the interaction between the network components and one user device 602 in accordance with many of the embodiments. However, it will be appreciated that the same process for providing web-telco converged services will be applied to one or more other partys that may be participating in any given service. Also, this example shown in FIG. 6 relates to the WTCF triggering the new or updated user interface in relation to telco protocol messages however, as discussed hereinabove, the VTF 603 may generate a new or updated interface description in response to a change in a state transition or without receiving any telco domain related information or data.

In the example shown in FIG. 6, a session control function 607 forwards 609 the telco protocol messages relating to the session oriented service to the WTCF 605. The WTCF 605 extracts 610 from each telco protocol message all user interface relevant data which is forwarded to the VTF 603 via the API 611. The VTF 603 generates 612 a new or updated user interface description, for example, a HTML page with embedded Javascript code, and determines a URL for the generated user interface description. In order to generate the new or updated user interface description the VTF 603 may obtain or retrieve web assets from the Internet 620 in the web domain 604 and mash up the web data with the telco data. The VTF 603 forwards the URL to the WTCF 605 via the API 611.

The WTCF 605 includes 613 the received URL into the original telco protocol message and forwards the amended telco protocol message back to the session control function 607. The session control function 607 then transmits 614 the telco protocol messages including the URL to the user device 602 via a mobile access network 608 and the connection 615 to the user device 602. In order to improve responsiveness, the VTF 603 may just allocate a URL and send it to the WTCF 605 immediately after having received the information from the telco domain. While the URL is being transmitted to the user device 602 and the user device issues the HyperText Transfer Protocol (HTTP) request to obtain or retrieve the user interface description, the VTF 603 has time to prepare in parallel and setup the user interface description to be sent in the HTTP response related to the user device HTTP request.

A telco protocol User Agent 616 in the user device 602 receives the telco protocol message which includes the URL. The User Agent 616 identifies the telco protocol message includes a URL for the user interface and, via the framework component 617 instructs or triggers the browser 618 to retrieve the new or updated user interface. The browser 618 via a connection 619, for example, a HTTP connection, to the web domain goes to the location specified by the URL to obtain the new or updated user interface from appropriate location in the Internet 620.

Accordingly, many of the embodiments of the present invention enable an improved web-telco convergence enabling the mash up of web assets with telco services in order to provide an enhanced or enriched telco session oriented service to the users.

The improved web-telco convergence of many of the embodiments can be applied to many if not all of the telco session oriented services that are presently available to mobile device users as well as enable new session oriented services to be developed in the future.

For example, many of the embodiments enable web content, e.g. a web based business card, multimedia data, and so on, to be rendered on a user device while the user device is being rung, e.g. during the ringing phase, and therefore prior to a call being established.

In a further example, many of the embodiments enable the display of web assets, e.g. a sender's social website information or address, when an SMS is received from the sender. Thus, the receiving party's user device may display not only the information about the received SMS message but also related information from the social website relating to the sender. Thus, the use of well known telco communication services can be enriched by adding information and content from the web. This means not only adding information but also analysing such information to control and execute the service in a better way, e.g. personalized, efficiently, with richer content etc. Data aiming to derive the "context" in which the user is utilising the telco services can be collected from both the web domain and the telco domain so that further intelligence could be applied to provide a rich communication experience to the user.

Described above are simply a couple of examples as to the use of many of the embodiments of the present invention. As will be appreciated by a person skilled in the art the embodiments of the present invention may be applied to any or all of the traditional telco session oriented services and applications.

Many of the embodiments of the present invention have several advantages, for example, as a substantially small part of the controller of the converged application and substantially a full telco protocol user agent are implemented on the user device then in the case of no connectivity between the user device and the web domain, some basic functionality is guaranteed by the view, the controller and the model parts (according to the MVC pattern representation) on the user device. They are simplified to enable at least the use telco services. Furthermore, access to local resources on the user device is possible as the commands/requests for local resources is encapsulated in the user agent model and exposed by appropriate user device API. However, as parts of the controller and the user agent model are implemented on the user device, the flexibility is not compromised, because the actual application controller for the web-telco convergence and models are implemented in the network, e.g. in the web domain and/or in the telco domain. Moreover, a single view of the converged application is enabled and controlled by the converged application model in the network.

Many of the embodiments of the present invention advantageously enable traditional telco session oriented services and applications performed over the telco domain can be enhanced and enriched with web assets such as information from the web domain. Also, the VTF may control the telco oriented session based on the mash up of web and telco domain information by embedding scripting language commands into the user interface descriptions generated by the VTF.

While preferred embodiments of the invention have been shown and described, it will be understood that such embodiments are described by way of example only. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

The invention claimed is:

1. A method comprising:
receiving user interface relevant information from a web-telco convergence function in a telecommunication domain wherein said user interface relevant information relates to a session oriented service for a user;
obtaining web assets from a web domain relating to said session oriented service based on said received user interface relevant information;
generating a user interface description based on one or both of said received user interface relevant information and said obtained web assets;
determining an address of a location of said generated user interface description; and
transmitting a request message to said web-telco convergence function wherein said request message includes said address and requests that said address is transmitted to a user device of said user via said telecommunication domain so as to enable said user device to obtain said user interface description from the location identified by said address.

2. The method as claimed in claim 1 further comprising:
generating script commands wherein said script commands control at least part of said telecommunication session oriented service for said user; and
embedding said script commands in said user interface description.

3. The method as claimed in claim 1 further comprising:
storing said user interface description at a location in said web domain wherein said address relates to the location of said stored user interface description.

4. The method as claimed in claim 1 further comprising:
generating commands for the telecommunication session oriented service for said user; and
transmitting said commands to said web-telco convergence function.

5. An apparatus comprising:
a first input adapted to receive user interface relevant information from a web-telco convergence function in a telecommunication domain wherein said user interface relevant information relates to a session oriented service for a user;
a first processor adapted to obtain web assets from a web domain relating to said session oriented service based on said received user interface relevant information;
a second processor adapted to generate a user interface description based on one or both of said received user interface relevant information and said obtained web assets;
a third processor adapted to determine an address of a location of said generated user interface description; and
a first output adapted to transmit a request message to said web-telco convergence function wherein said request message includes said address and requests that said address is transmitted to a user device of said user via said telecommunication domain so as to enable said user device to obtain said user interface description from the location identified by said address.

6. The apparatus as claimed in claim 5, in which said second processor is further adapted to generate script commands wherein said script commands control at least part of said telecommunication session oriented service for said user; and
said second processor is further adapted to embed said script commands in said user interface description.

7. The apparatus as claimed in claim 5 further comprising:
a fourth processor adapted to store said user interface description at a location in said web domain wherein said address relates to the location of said stored user interface description.

8. The apparatus as claimed in claim 5 further comprising:
a fifth processor adapted to generate commands for the telecommunication session oriented service for said user; and
a second output adapted to transmit said commands to said web-telco convergence function.

9. A non-transitory computer readable executable code for:
receiving user interface relevant information from a web-telco convergence function in a telecommunication domain wherein said user interface relevant information relates to a session oriented service for a user;
obtaining web assets from a web domain relating to said session oriented service based on said received user interface relevant information;
generating a user interface description based on one or both of said received user interface relevant information and said obtained web assets;
determining an address of a location of said generated user interface description; and
transmitting a request message to said web-telco convergence function wherein said request message includes said address and requests that said address is transmitted to a user device of said user via said telecommunication domain so as to enable said user device to obtain said user interface description from the location identified by said address.

10. A method comprising:
receiving telecommunication protocol messages relating to a telecommunication session oriented service for a user;
identifying user interface relevant information in said received telecommunication protocol messages;
transmitting said identified user interface relevant information to a virtual terminal function;
receiving a request message from said virtual terminal function wherein said request message includes an address of a location of a user interface description and wherein said user interface description is based on web assets obtained from a web domain by said virtual terminal function; and
transmitting said address to a user device of said user so as to enable said user device to obtain said user interface description from the location identified by said address.

11. The method as claimed in claim 10 in which said step of transmitting said address to a user device further comprises:
inserting said address into a payload of said received telecommunication protocol messages.

12. The method as claimed in claim 10 further comprising:
receiving commands from said virtual terminal function; and
executing said commands.

13. An apparatus comprising:
a first input adapted to receive telecommunication protocol messages relating to a telecommunication session oriented service for a user;
a first processor adapted to identify user interface relevant information in said received telecommunication protocol messages;
a first output adapted to transmit said identified user interface relevant information to a virtual terminal function;
a second input adapted to receive a request message from said virtual terminal function wherein said request message includes an address of a location of a user interface description and wherein said user interface description is based on web assets obtained from a web domain by said virtual terminal function; and
a second output adapted to transmit said address to a user device of said user so as to enable said user device to obtain said user interface description from the location identified by said address.

14. The apparatus as claimed in claim 13 further comprising:
a second processor adapted to said address into a payload of said received telecommunication protocol messages.

15. The apparatus as claimed in claim 13 further comprising:
a third input adapted to receive commands from said virtual terminal function; and
a second processor adapted to execute said commands.

16. A non-transitory computer readable executable code for:
receiving telecommunication protocol messages relating to a telecommunication session oriented service for a user;
identifying user interface relevant information in said received telecommunication protocol messages;
transmitting said identified user interface relevant information to a virtual terminal function;
receiving a request message from said virtual terminal function wherein said request message includes an address of a location of a user interface description and wherein said user interface description is based on web assets obtained from a web domain by said virtual terminal function; and
transmitting said address to a user device of said user so as to enable said user device to obtain said user interface description from the location identified by said address.

17. A method comprising:
receiving a message from a web-telco convergence function wherein said message relates to a telecommunication session oriented service for a user and said message includes an address of a location of a user interface description;
obtaining said user interface description from said location based on said address; and
displaying said user interface description wherein said user interface description relates to a web-telco converged display for said telecommunication session oriented service.

18. The method as claimed in claim 17 further comprising:
identifying script commands in said user interface description wherein said script commands control at least part of said telecommunication session oriented service; and
executing said identified script commands.

19. An apparatus comprising:
an input adapted to receive a message from a web-telco convergence function wherein said message relates to a telecommunication session oriented service for a user and said message includes an address of a location of a user interface description;
a first processor adapted to obtain said user interface description from said location based on said address; and
a second processor adapted to display said user interface description wherein said user interface description relates to a web-telco converged display for said telecommunication session oriented service.

20. The apparatus as claimed in claim 19 further comprising:
a third processor adapted to identify script commands in said user interface description wherein said script commands control at least part of said telecommunication session oriented service; and
a fourth processor adapted to execute said identified script commands.

21. A non-transitory computer readable executable code for:
receiving a message from a web-telco convergence function wherein said message relates to a telecommunication session oriented service for a user and said message includes an address of a location of a user interface description;
obtaining said user interface description from said location based on said address; and
displaying said user interface description wherein said user interface description relates to a web-telco converged display for said telecommunication session oriented service.

* * * * *